July 3, 1923.   E. L. FULLER   1,461,000

METHOD OF MAKING INNER TUBES

Filed Aug. 16, 1920

Inventor
Ernest L. Fuller
By R. D. Trogner
Attorney

Patented July 3, 1923.

1,461,000

UNITED STATES PATENT OFFICE.

ERNEST L. FULLER, OF AKRON, OHIO, ASSIGNOR TO THE GOODYEAR TIRE & RUBBER COMPANY, OF AKRON, OHIO, A CORPORATION OF OHIO.

METHOD OF MAKING INNER TUBES.

Application filed August 16, 1920. Serial No. 403,685.

*To all whom it may concern:*

Be it known that I, ERNEST L. FULLER, a citizen of the United States, residing at Akron, in the county of Summit and State of Ohio, have invented new and useful Improvements in the Method of Making Inner Tubes, of which the following is a specification.

My invention relates to a method of forming inner tubes for pneumatic tires, and is particularly concerned with the formation of the valve-receiving opening in the inner tube.

Heretofore difficulty has been experienced in the manufacture of inner tubes in forming the valve-receiving openings in the inner tubes, which have been punched by a suitable mechanical device, but the openings are frequently not provided with straight walls, which, of course, makes it difficult to obtain an air tight joint with the valve stem.

The principal object of my invention is to provide inner tubes with openings which shall be uniformly straight walled and consequently insure a suitable union with the valve stems.

Other and ancillary objects will be apparent from the following detailed description of my invention in conjunction with the accompanying drawings.

In the drawings, Fig. 1 is a plan view of a sheet of rubber and a mandrel employed in a preliminary step of forming an inner tube thereon.

In practicing my invention an inner tube is formed by the usual method of winding a sheet of rubber upon a straight mandrel, which is then removed from the straight mandrel, disposed upon a curved mandrel and subjected to a vulcanizing heat. Before the sheet of rubber is rolled upon the first mandrel a valve patch is placed in a suitable position upon the rubber and a tubular member is disposed in the opening provided in the valve patch. The valve patch and the tubular member carried thereby are, of course, interposed between the convolutions of rubber when it is rolled upon the mandrel.

When the formed tube is subjected to heat in a vulcanizing oven the rubber becomes soft and permits the tubular member to cut an opening therein, which action is supplemented by a slight tension which is created when the rubber is vulcanized.

Figure 1:
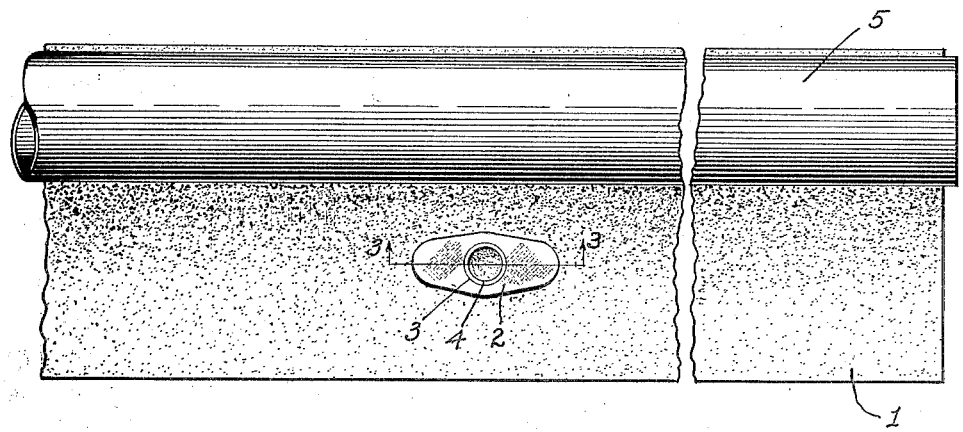
Figure 2:
Fig. 2 is a sectional view of a tubular member which is utilized in forming an inner tube in accordance with my invention.
Figure 3:
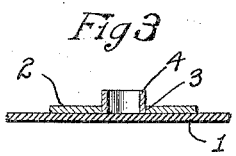
Fig. 3 is a sectional view taken substantially along the line 3—3 of Fig. 1.

As shown in Fig. 1, a sheet of rubber 1, of suitable dimensions, has a valve patch 2 formed of fabric, or other suitable material, disposed in a proper position upon the sheet 1. The patch 2 is, of course, provided with a central opening 3 into which a tubular member 4 is placed. The tubular member 4 may be a ferrule formed of any suitable metal, the fuction of which is to provide a valve-receiving opening in the formed tube.

A mandrel 5 is placed adjacent one edge of the rubber sheet 1 and the sheet rolled thereon, which of course disposes the patch 2 between the convolutions of rubber. The rolled tube of rubber is then removed from the mandrel 5 and disposed upon a circular mandrel, not shown, and wrapped by winding a strip of untreated fibrous material about the tube. The structure thus formed is disposed in a suitable heating chamber and heat applied to cure the rubber sheet 1. When the heat is applied, the rubber is softened and the ferrule 4 cuts through the rubber, due to its softened condition, and to a tension that is created in the rubber by the vulcanization, which is also supplemented by the confining action of the wrapping of fibrous material.

After the tube has been thoroughly cured it is removed from the oven. The fibrous wrapping is removed and the tube stripped from the mandrel, the ferrule 4 being taken out of the opening which it has made in the tube.

It will be appreciated that by this method the valve-receiving opening provided in the tube is straight walled and, therefore, insures a good union with the valve stem.

The above described method contains the operations that are generally followed in the manufacture of inner tubes and it is not unduly complicated by the additional step of disposing the metal tube in a valve patch to provide the valve-receiving opening in the tube.

Although I have illustrated and specifically described a method of forming inner tubes in accordance with my invention, it is obvious that minor changes may be made in the sequence of operations and in the selection of materials, without departing from the spirit and scope of my invention, and I desire, therefore, that no limitations shall be imposed except such as are indicated in the appended claims.

What I claim is:

1. The method of making inner tubes that comprises disposing a ferrule upon a sheet of uncured rubber, forming a tube of the rubber, subjecting it to heat and pressure, and removing the ferrule therefrom.

2. The method of making inner tubes that comprises disposing a valve patch upon a sheet of uncured rubber, disposing a metallic tube in the opening of the valve patch, rolling the sheet to form a tube, wrapping the tube with a fibrous strip to compact it and effect a piercing thereof by the metallic tube, subjecting the tube to heat to vulcanize the rubber, removing the metallic tube from the cured rubber.

3. The method of making inner tubes that comprises, disposing a valve patch upon a sheet of uncured rubber, placing a metallic tube partially within the opening of the valve patch, forming an inner tube of the sheet of rubber, and removing the metal tube therefrom.

4. A method of making inner tubes for pneumatic tires which consists in forming a tube from vulcanizable rubber composition, making a reinforcing valve-base with a central opening, assembling the valve-base and tube, setting a hole-molding-element in the opening in the reinforcing valve-base and curing the tube.

5. A method of making inner tubes for pneumatic tires which consists in forming a tube from vulcanizable rubber composition, making a reinforcing valve-base of strain resisting threads and with a central opening, incorporating the valve-base in the tube and introducing a hole-molding-element in the opening therein, curing the tube to shape, and finally removing the hole-molding-element.

6. The method of making inner tubes that comprises disposing a valve patch upon a sheet of uncured rubber, disposing a metallic-cutting-element in an opening of the valve patch, rolling the sheet to form a tube, wrapping the tube with a fibrous strip to compact it and effect a cutting thereof by the metallic-cutting-element, subjecting the tube to heat to vulcanize the rubber, and removing the metallic-cutting-element from the cured rubber.

7. A method of making inner tubes for pneumatic tires which consists in forming a tube from vulcanizable rubber composition, making a reinforcing valve-base with a central opening, assembling the valve-base and tube, setting a hole-cutting-element in the opening in the reinforcing valve-base and curing the tube.

In witness whereof, I have hereunto signed my name in the presence of two subscribing witnesses.

ERNEST L. FULLER.

Witnesses:
JOHN E. KEATING,
L. M. HARTMAN.